United States Patent [19]

Janzen

[11] 4,095,272

[45] June 13, 1978

[54] AUTOMATIC TURBIDIMETRIC TITRATION

[75] Inventor: G. Jay Janzen, Bartlesville, Okla.

[73] Assignee: Phillips Petroleum Company, Bartlesville, Okla.

[21] Appl. No.: 758,524

[22] Filed: Jan. 11, 1977

[51] Int. Cl.$^2$ ........................ G06G 7/58; G01N 31/16

[52] U.S. Cl. ................................ 364/497; 23/230 R; 23/253 R; 204/1 T; 204/195 T; 364/579

[58] Field of Search .......... 235/151.12, 151.3, 151.35; 23/230 R, 230 A, 253 R, 253 A, 253 TP, 232 R, 259, 292, 255 R, 255 E; 204/195 T, 1 T; 324/30 R, 30 A, 30 B

[56] References Cited

U.S. PATENT DOCUMENTS

| | | | |
|---|---|---|---|
| 3,266,504 | 8/1966 | Sundstrom | 235/151.12 X |
| 3,499,733 | 3/1970 | Abbott et al. | 23/253 R |
| 3,626,742 | 12/1971 | Hogan et al. | 23/232 R |
| 3,663,176 | 5/1972 | Cagle et al. | 23/232 R |
| 3,765,841 | 10/1973 | Paulson et al. | 23/230 R |
| 3,769,178 | 10/1973 | Rothermel, Jr. | 23/230 R X |
| 3,870,466 | 3/1975 | Rellstab et al. | 23/230 R |
| 3,879,604 | 4/1975 | Malmuig | 235/151.3 |
| 3,881,992 | 5/1975 | Ralston | 23/230 R X |

OTHER PUBLICATIONS

Sargent-Malmstadt Automatic Spectro/Electro Titrator - Instruction Manual - Catalog No. 29700 - E. H. Sargent & Co.

Spectronics Incorporated - "Optical Switches"- Bulletin Clairex Electronics Bulletin-Optical Switches, Jun. 1975.

Markus - "Electronic Circuits Manual"- McGraw-Hill, 1971.

Lambert-"Volumetric Analysis of Colloidal Electrolytes by Turbidity Titration"- Journal of Colloid Science, vol. 2, pp. 479-493, (1974).

*Primary Examiner*—Joseph F. Ruggiero

[57] ABSTRACT

The turbidity of the medium being titrated is continuously measured and an analog signal representative thereof is differentiated. The resulting first derivative signal is compared with a reference signal to produce a control signal when the derivative signal has a predetermined relationship to the reference signal. A titration end point signal, representative of the amount of titrant added to the medium being titrated in order to achieve said predetermined relationship, is produced responsive to said control signal.

12 Claims, 4 Drawing Figures

AUTOMATIC TURBIDIMETRIC TITRATION

This invention relates to method and apparatus for effecting turbidimetric titration.

During a titration between antagonistic ionic surfactants, e.g. hexadecyltrimethylammonium bromide and sodium di(2-ethylhexyl) sulfosuccinate, the reaction product is an insoluble solid. This solid forms as a finely divided precipitate which renders the titration mixture increasingly turbid up to the equivalence point. The presence of unreacted hexadecyltrimethylammonium bromide in the early stages of the titration tends to keep the precipitate particle size small and to solubilize some of the reaction product. As equivalence is approached and the excess hexadecyltrimethylammonium bromide is exhausted, turbidity builds up rapidly due to both particle growth and the formation of additional precipitate. After the equivalence point is reached, the turbidity falls off again due to flocculation and settling of the already formed precipitate in the presence of excess titrant. These effects produce, in coincidence with the equivalence point, a turbidity maximum suitable for instrumental detection. This turbidity maximum can be at least approximately determined with commercially available derivative titration apparatus having elaborate, general purpose electronics. In one such unit, the output of a first thyraton tube, which is governed by the second derivative of the measurement signal, is differentiated to produce pulses when the thyraton tube output changes state. These pulses are employed to control a second thyraton tube which in turn drives the control relay. However, it is desirable to both enhance the accuracy of the titration and to simplify the equipment for conducting the titration.

Accordingly, it is an object of the invention to provide a new and improved method and apparatus for effecting turbidimetric titration. Another object of the invention is to provide simple and relatively inexpensive special purpose equipment for conducting turbidimetric titration. Another object of the invention is to improve the accuracy of turbidimetric titration. Other objects, aspects and advantages of the invention will be apparent from a study of the specification, the drawings and the appended claims to the invention.

In the drawings, FIG. 1 is a graphical illustration of the photometric signal obtainable during addition of titrant at a constant rate in a titration between antagonistic ionic surfactants;

Figure 1:
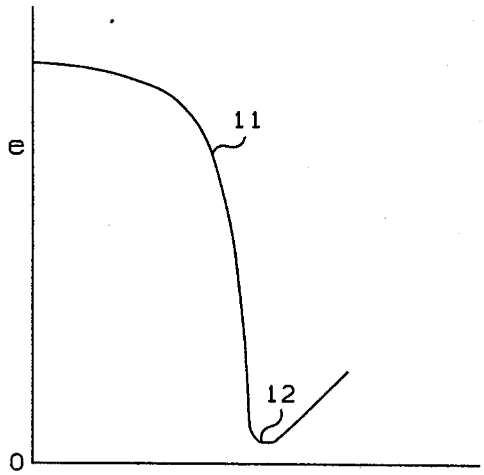
Figure 2:
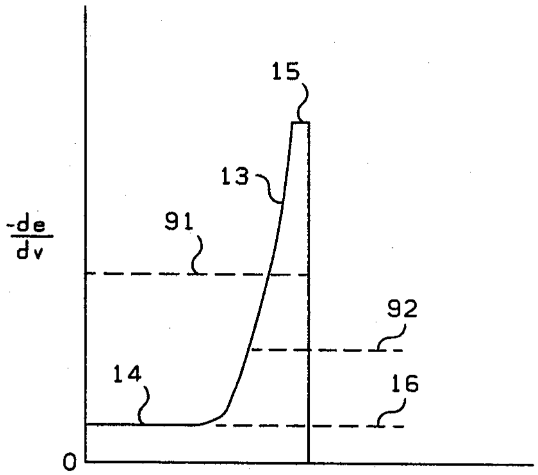
FIG. 2 is a graphical illustration of the output of an inverting differentiating circuit having the signal of FIG. 1 as an input thereto.

The photometric signal obtained during the addition of titrant at a constant rate has the form of curve 11 depicted in FIG. 1, i.e. it originally has essentially a zero slope, which subsequently becomes increasingly negative out to the end point 12, where it suddenly reverts to zero or a slightly positive value. The output of an inverting differentiating circuit, having curve 11 as the input, is shown in FIG. 2 as curve 13. With the initial zero slope portion of curve 11, the output of the inverting differentiator is just the small positive zero-offset voltage level 14 inherent in the amplifier portion of the differentiator. The differentiator output rises to a sharp peak 15 immediately before the end point and then drops back to the zero-offset voltage or below. The titration end point is considered to be at the intersection of the line 16 and the down slope portion of curve 13 immediately following peak 15.

Figure 3:
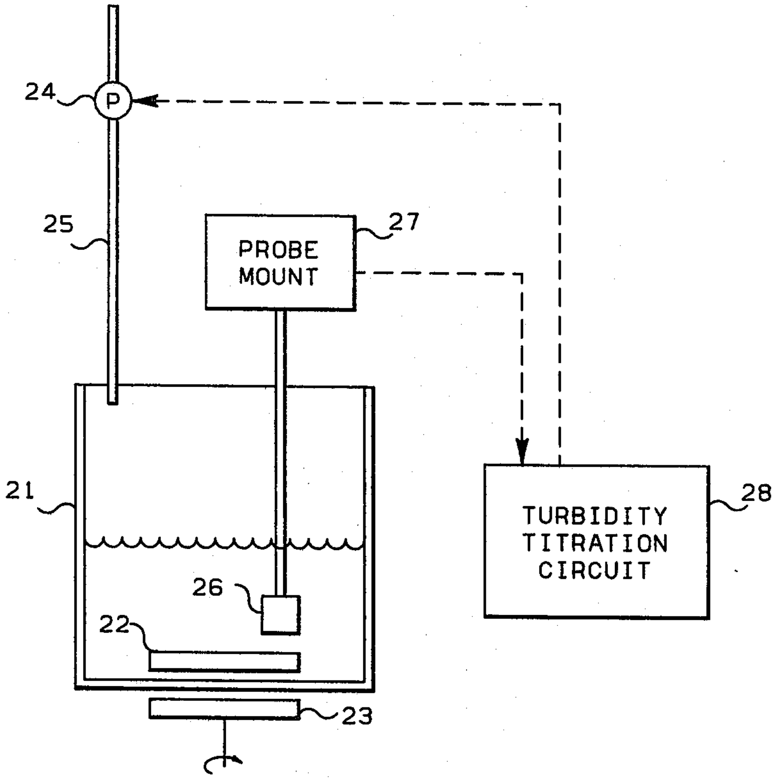
FIG. 3 is a diagrammatic illustration of a turbidity titration system.

In FIG. 3, the liquid to be titrated is positioned in vessel 21, which is equipped with a magnetic spin bar 22 driven by externally mounted magnetic stirrer 23. During titration, the titrant liquid is passed by pump means 24 at a constant rate of flow through conduit means 25 into vessel 21. A probe 26 is immersed in the titration medium in vessel 21 by probe mount 27. The output of the probe sensor is applied to turbidity titration circuit 28 which deactuates pump 24 at the titration end point.

Figure 4:
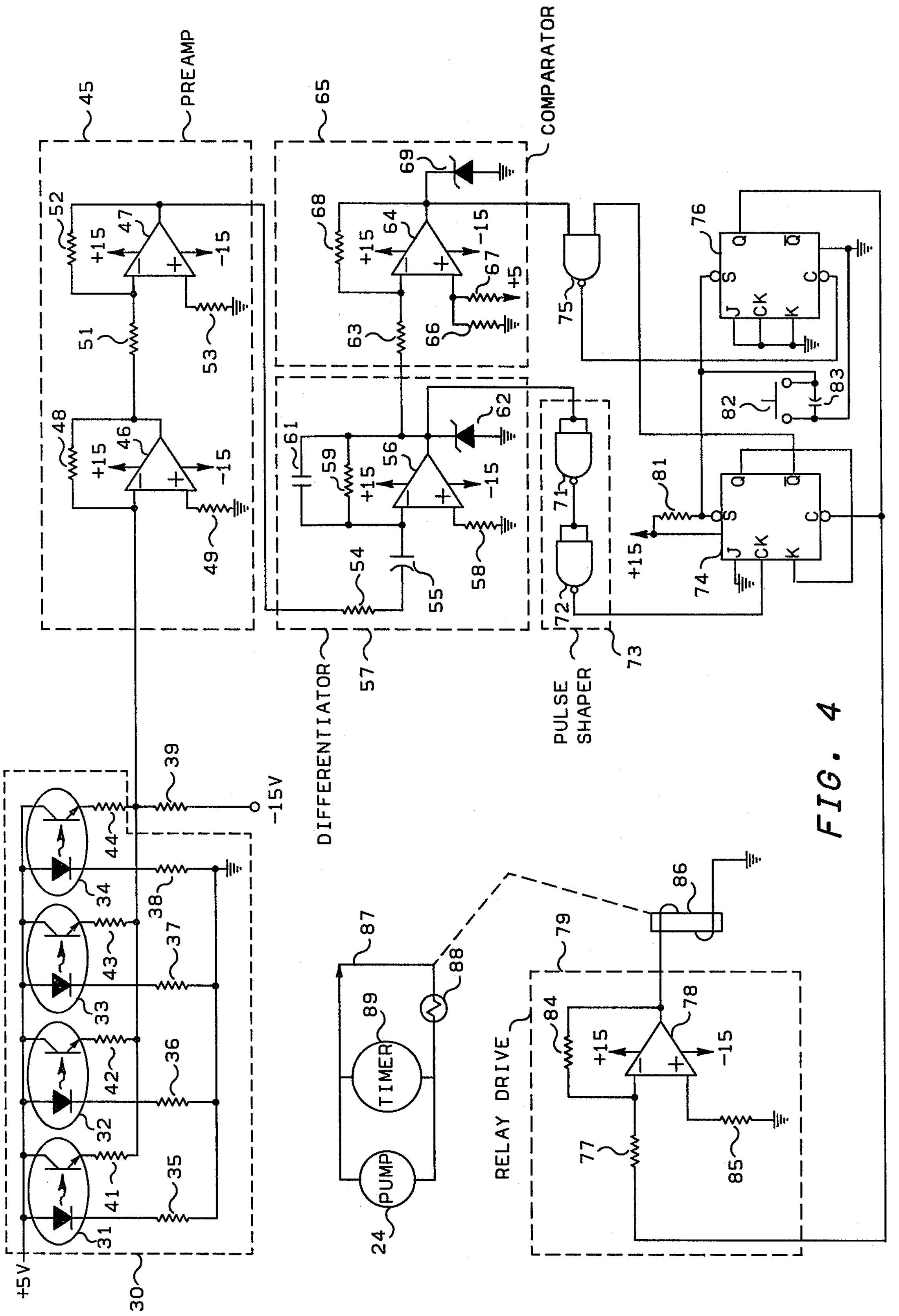
FIG. 4 is a diagrammatic representation of an automatic photometric titrator embodying the present invention.

Referring now to FIG. 4, the probe sensor 30 comprises four hermetic optoelectronic devices 31, 32, 33 and 34, commonly called optical switches, electrically connected in parallel and mounted on probe 26 for immersion in the turbidity titration medium. The anode of the light emitting diode (LED) and the collector of the photoransistor in each optoelectronic device are connected to a suitable voltage source, e.g. 5 volts D.C. Each of resistors 35, 36, 37 and 38 is connected between electrical ground and the cathode of a respective one of the LED's. Each of resistors 41, 42, 43 and 44 is connected between a first terminal of resistor 39 and the emitter of a respective one of the phototransistors. The second terminal of resistor 39 is connected to a suitable source of voltage, e.g. −15 volts D.C. The probe sensor 30 continuously produces an analog measurement current signal representative of the turbidity of the medium being titrated.

The preamplifier 45 comprises two operational amplifiers 46 and 47 connected in series. The negative input terminal of current amplifier 46 is connected to the junction between resistor 39 and resistors 41, 42, 43 and 44, and through resistor 48 to the output terminal of current amplifier 46. The positive input terminal of current amplifier 46 is connected through resistor 49 to ground. The negative input terminal of amplifier 47 is connected through resistor 51 to the output terminal of current amplifier 46 and through resistor 52 to the output terminal of amplifier 47. The positive input terminal of amplifier 47 is connected through resistor 53 to ground.

The output terminal of amplifier 47 is connected through resistor 54 and capacitor 55 to the negative input terminal of operational amplifier 56 of differentiator 57. Resistor 58 is connected between the positive input terminal of amplifier 56 and ground. Resistor 59 and capacitor 61 are connected in parallel between the negative input terminal of amplifier 56 and the output terminal thereof. The cathode of Zener diode 62 is connected to the output terminal of amplifier 56 while the anode of diode 62 is connected to ground to serve as a limiter. The differentiator 57 produces, responsive to the analog measurement signal from the probe sensor 30, a differentiated analog voltage signal representative of the negative first derivative of the analog measurement signal.

Resistor 63 is connected between the output terminal of amplifier 56 and the negative input terminal of operational amplifier 64 of comparator 65. The positive input terminal of amplifier 64 is connected through resistor 66 to ground and through resistor 67 to a suitable source of voltage, e.g. 5 volts D.C. Resistor 68 is connected between the negative input terminal of amplifier 64 and the output terminal thereof. The cathode of Zener diode 69 is connected to the output terminal of amplifier 64 while the anode thereof is connected to ground to serve as a limiter. Comparator 65 is adapted to compare the differentiated analog voltage signal from differentiator 57 with a reference signal represented by the voltage at the junction of resistors 66 and 67 to produce a control signal pulse when the differentiated analog voltage signal bears a predetermined relationship, e.g. slightly smaller, with the reference signal.

The output terminal of differentiator 57 is connected to the two input terminals of a conjunctive hysteretic logic circuit 73, in this instance two cascaded NAND (Schmitt-Trigger) circuits. The output terminal of NAND circuit 71 is connected to the two input terminals of NAND circuit 72. NAND circuits 71 and 72 constitute pulse shaper 73 and serve to shape the output pulse produced by differentiator 57. The output terminal of NAND circuit 72 is connected to the clock terminal of flip-flop circuit 74. The J input terminal of flip-flop circuit 74 is connected to ground. The K input terminal of flip-flop circuit 74 is connected to the Q output termial thereof. The Q output terminal of flip-flop circuit 74 is connected to one input terminal of NAND circut 75, the other input terminal of NAND circuit 75 being connected to the outpt terminal of comparator amplifier 64. The Q and Q outputs of flip-flop circuit 74 represent the two states thereof. The output terminal of NAND circuit 75 is connected to the clear terminal of flip-flop circuit 76. The clock terminal and the J and K input terminals of flip-flop circuit 76 are connected to ground. The Q output terminal of circuit 76 is unconnected, while the Q output terminal of circuit 76 is connected to the clear terminal of flip-flop circuit 74 and through resistor 77 to the negative input terminal of operational amplifier 78 of relay drive 79. The set terminals of flip-flop circuits 74 and 76 are connected through resistor 81 to a suitable source of voltage, e.g. 5 volts D.C., as well as being connected directly to one terminal of normally open pushbutton switch 82. The other terminal of switch 82 is connected to ground and capacitor 83 is connected between the terminals of switch 82.

Resistor 84 is connected between the output terminal of amplifier 78 and the negative input terminal thereof, while resistor 85 is connected between the positive input terminal of amplifier 78 and ground. Solenoid 86 is connected between the output terminal of amplifier 78 and ground. Actuator switch 87 is connected in series with pump 24 and the A.C. electrical power supply means 88. Timer 89 is connected in parallel with pump 24. Thus, knowing the constant rate of addition of titrant by pump 24, the output of timer 89 can be employed as the titration end-point signal representative of the amount of titrant added to the medium being titrated in order to achieve the predetermined relationship between the reference signal at the junction of resistors 66 and 67 and the differentiated analog voltage signal from differentiator 57.

In the operation of the automatic turbidimetric titration system, the operator places the medium to be titrated in vessel 21 an presses pushbutton switch 82 to start the titration. The momentary grounding of the SET terminals of flip-flop circuits 74 and 76 resets them to the RUN condition wherein the presence of a voltage at the Q output of flip-flop circuit 76 causes relay drive 79 to actuate relay 86 to close switch 87, thereby connecting pump 24 and timer 89 across power supply means 88, starting pump 24 and timer 89. The output current signal from sensor 30, which follows the pattern shown in FIG. 1, is converted to a voltage signal by amplifier 46, inverted in amplifier 47 and applied to the input of inverting differentiator 57. The corresponding output signal of differentiator 57 follows the pattern shown in FIG. 2. When the output voltage of differentiator 57 reaches the predetermined value represented by dashed line 91, NAND circuit 71 is actuated. When the derivative voltage subsequently peaks and decreases below level 92, NAND circuit 71 is deactuated, thereby actuating NAND circuit 72 to provide a clock pulse to flip-flop circuit 74, thereby causing flip-flop circuit 74 to change state, resulting in an enabling voltage from output Q to be applied as an enabling pulse to NAND circuit 75. However, at this time the positive output signal from comparator 65 prevents NAND circuit 75 from providing a high output voltage. When the output voltage from differentiator 57 subsequently decreases below level 91 and 92 to level 16, the output signal of comparator 65 goes high (to positive), thereby actuating NAND circuit 75 to pass a pulse to flip-flop circuit 76 to reset it to the NON-RUN state. This deactuates solenoid 86, thereby opening switch 87 to stop the pump 24 and the timer 89. The reading on timer 89 at deactuation is indicative of the titration endpoint.

Diode 62 limits negative going noise portions of the derivative signal into comparator 65, thereby suppressing potential relay chatter. It also Zeners to prevent overloading inputs of 71. Similarly diode 69 limits noise portions of the signal and overvoltage going from comparator 65 to NAND circuit 75. The values of resistor 59 and capacitor 55 govern the gain of the differentiator and are chosen to give adequate peak height for triggering flip-flop 74 at the appropriate time while maintaining noise immunity. Further suppression of noise due to high frequencies can be obtained by suitable choice of the product of the resistance of resistor 54 and the capacitance of capacitor 55 and of the value of capacitor 61. Resistors 66 and 67 can be adjustable to afford fine control of the actual cut-off point on the down slope side of the derivative peak.

While optoelectronic devices 31, 32, 33 and 34 can be any suitable devices, a presently preferred embodiment employs Solar Systems SSOS-800 infrared optoelectronic devices which have been modified by cementing plane glass windows over the original lenses in order to maintain collimation of the light emitting diode output beams. The signals can be lost if the convex lenses of the unmodified device are wetted by the titration mixture. No dark enclosure is needed with the infrared devices as the infrared system is substantially insensitive to ambient light conditions normally encountered in a laboratory. Another advantage of the infrared system is that it virtually ignores the very fine precipitate particles formed during early stages of the titration but reacts strongly when rapid particle size growth sets in just before the eqivalence point. The result is a sharpening of the characteristic end point feature in the titration curve. The probe 26 can be in the form of a generally flat board in order to additionally serve as a vortex baffle so that the sample can be stirred during titration to provide adequately rapid mixing with minimum signal noise due to the air bubbles and turbulence. The use of a plurality (e.g., four) optical switches instead of a single unit also provides an improvement in the signal to noise ratio. However it is possible to employ an external optical system of one or more regulated incandescent light sources, condensing lenses, filters, and one or more light detectors, e.g. photoresistive cells.

In a presently preferred embodiment of the circuitry of FIG. 4, the following elements were employed:

| | |
|---|---|
| optical switches 31, 32, 33 and 34 | Solar Systems SSOS-800 optical switches modified as hereinabove described. |
| resistors 35, 36, 37 and 38 | 82 ohms |
| resistors 41, 42, 43 and 44 | 1.2K ohms |
| amplifiers 46, 47, 56 and 64 | ½ of model 747, dual operational amplifier |
| amplifier 78 | model 741, operational amplifier |
| resistor 39 | 1.3K ohms |
| resistor 48 | 5.6K ohms |
| resistor 49 | 1.0K ohms |
| resistors 51, 52 | 5.6K ohms |
| resistor 53 | 2.4K ohms |
| resistor 54 | 1.0M ohm |
| capacitor 55 | 1 pf |
| resistors 58, 67, 77, 81 | 10K ohms |
| resistor 59 | 10M ohms |
| capacitor 61 | 33 pf |
| Zener diodes 62, 69 | 1 N 4732 (4.7 v ± 10%) |
| resistors 63, 66 | 2.2K ohms |
| resistor 68 | 12K ohms |
| NAND circuits 71, 72, 75 | ¼ model N 74132, quadruple Schmitt-Triggers |
| flip-flop circuits 74, 76 | ½ model N 7476, dual J-K Master-Slave Flip-Flop |
| capacitor 83 | .03 pf |
| resistor 84 | 39K ohms |
| resistor 85 | 8.2K ohms |
| Solenoid 86 (relay) | MS64-902 Essex-Stancor |
| pump 24 | model RP1-50-SS, Fluid Metering Inc. |
| timer 89 | Cramer Series 636 WE 100 |

Reasonable variations and modifications are possible within the scope of the foregoing disclosure, the drawings and the appended claims to the invention. While the invention has been illustrated with the combination of timing means and means for introducing the titrant at an at least substantially constant rate, it is within the scope of the invention to employ titrant feeding means which supplies titrant at a gradual, although not necessarily constant rate, in combination with means for integrating the flow of titrant occurring up to the end point. Numerous variations of the circuitry can be employed. For example, with the proper selection of signal polarities, an AND circuit can be employed instead of the NAND circuit 75. Schmitt-Trigger inverters (SN 7414) can be employed instead of the NAND circuits 71 and 71. Other configurations of sensor circuits, amplifier circuits, differentiator circuits, comparison circuits, pulse shaping circuits and flip-flop circuits can be employed to achieve the same functional relationships.

That which is claimed is:

1. Automatic turbidimetric titration apparatus comprising means adapted to contain a liquid medium to be titrated;

titrant supply means adapted to introduce a turbidimetric titrant into said medium at a gradual rate;

optoelectronic means adapted to produce an analog measurement signal representative of the turbidity of the medium being titrated;

differentiating means adapted to produce, responsive to said analog measurement signal, a differentiated signal representative of the first derivative of said analog measurement signal;

means adapted to compare said differentiated signal with a reference signal and to produce a control signal when said differentiated signal has a predetermined relationship with said reference signal, said predetermined relationship being representative of the occurrence of the titration end-point; and means responsive to said control signal adapted to produce a titration end-point signal representative of the amount of said titrant added to the medium being titrated in order to achieve said predetermined relationship between said reference signal and said differentiated signal.

2. Apparatus in accordance with claim 1 wherein said titrant supply mans is adapted to introduce said titrant into said medium at an at least substantially constant rate.

3. Apparatus in accordance with claim 2 wherein said differentiating means is adapted to produce said differentiated signal as being representative of the negative first derivative of said analog measurement signal.

4. Apparatus in accordance with claim 2 wherein said means adapted to produce said titration end-point signal comprises timing means; means for actuating, at the start of a titration, a timing means and said titrant supply means; and means for deactuating said timing means responsive to said control signal.

5. Apparatus in accordance with claim 4 wherein said means for actuating comprises electrical power supply means, switching means having a first switching position wherein said electrical power supply means is connected to said timing means and to said titrant supply means and a second switchin portion wherein said electrical power supply means is isolated from said timing means and said titrant supply means, and means for moving said switching means to said first switching position at the start of a titration, and wherein said means for deactuating said timing means comprises means for moving said switching means to said second switching position.

6. Apparatus in accordance with claim 5 wherein said means to produce a titration end-point signal further comprises control means adapted to apply said control signal to said means for deactuating said timing means, and means for enabling said control means responsive to said differentiated signal reaching a predetermined value and then falling back to a lower value.

7. Apparatus in accordance with claim 6 wherein said switching means comprises a switch having said first and second switching positions, and a solenoid means adapted to move said switch from one of said positions to the other of said positions; wherein said means for moving said switching means to said first switching position comprises a first flip-flop circuit having first and second states and having a first output in said first state of said first flip-flop circuit, means for applying the signal at said first output of said first flip-flop circuit to said solenoid means, and means for resetting said first flip-flop circuit to its first state at the start of a titration; wherein said means for moving said switching means to said second switching position comprises a conjunctive logic circuit having first and second inputs and an output, means connected to said output of said conjunctive logic circuit to reset said first flip-flop circuit from the first state thereof to the second state thereof, and means for applying said control signal to said first input of said conjunctive logic circuit; and wherein the output of said means for enabling is connected to said second input of said conjunctive logic circuit.

8. Apparatus in accordance with claim 7 wherein said means for enabling comprises a pulse shaping circuit connected to the output of said differentiating means, a second flip-flop circuit having a clock input and a first output, means connecting the output of said pulse shaping circuit to the clock input of said second flip-flop circuit, and means connecting the first output of said second flip-flop circuit to said second input of said conjuctive logic circuit.

9. Apparatus in accordance with claim 8 wherein said conjunctive logic circuit is a NAND circuit.

10. A method for turbidimetric titration comprising:

introducing a liquid medium to be titrated into a titration zone;

thereafter introducing a turbidimetric titrant into said medium at a gradual rate;

continuously measuring the turbidity of the medium being titrated and establishing an analog measurement signal representative thereof;

producing responsive to said analog measurement signal, a differentiated analog signal representative of the first derivative of said analog measurement signal;

comparing said differentiated analog signal with a reference signal and producing a control signal when said differentiated analog signal has a predetermined relationship with said reference signal, said predetermined relationship being representative of the occurrence of the titration end-point; and producing, responsive to said control signal, a titration end-point signal representative of the amount of said titrant added to the medium being titrated in order to achieve said predetermined relationship between said reference signal and said differentiated analog signal.

11. A method in accordance with claim 10 wherein the titrant is introduced into said medium at an at least substantially constant rate.

12. A method in accordance with claim 11 wherein said titration end point signal is produced by measuring the time interval between the start of the introduction of titrant into said medium and the production of said control signal.

* * * * *

UNITED STATES PATENT AND TRADEMARK OFFICE

CERTIFICATE OF CORRECTION

PATENT NO. : 4,095,272

DATED : June 13, 1978

INVENTOR(S) : G. Jay Janzen

It is certified that error appears in the above-identified patent and that said Letters Patent are hereby corrected as shown below:

Claim 2, column 6, line 10, "mans" should read -- means --.

Claim 4, column 6, line 20, after "titration," "a" should read -- said --.

Claim 5, column 6, line 28, "switchin" should read -- switching --; line 28, "portion" should read -- position --.

Signed and Sealed this

*Twenty-eighth* Day of *August 1979*

[SEAL]

*Attest:*

LUTRELLE F. PARKER

*Attesting Officer* *Acting Commissioner of Patents and Trademarks*